US012722080B2

(12) United States Patent
Liao

(10) Patent No.: US 12,722,080 B2
(45) Date of Patent: Sep. 1, 2026

(54) GAME CONTROLLING METHOD, TERMINAL, DEVICE, AND STORAGE MEDIUM

(71) Applicant: Beijing Zitiao Network Technology Co., Ltd., Beijing (CN)

(72) Inventor: Lei Liao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 327 days.

(21) Appl. No.: 18/572,347

(22) PCT Filed: Sep. 26, 2022

(86) PCT No.: PCT/CN2022/121277

§ 371 (c)(1), (2) Date: Dec. 20, 2023

(87) PCT Pub. No.: WO2023/082868

PCT Pub. Date: May 19, 2023

(65) Prior Publication Data

US 2024/0286036 A1 Aug. 29, 2024

(30) Foreign Application Priority Data

Nov. 9, 2021 (CN) ......................... 202111322780.8

(51) Int. Cl.
*A63F 13/53* (2014.01)
*A63F 13/56* (2014.01)

(52) U.S. Cl.
CPC .............. *A63F 13/53* (2014.09); *A63F 13/56* (2014.09); *A63F 2300/308* (2013.01)

(58) Field of Classification Search
CPC .... A63F 13/53; A63F 13/56; A63F 2300/308; A63F 2300/303; A63F 2300/306
(Continued)

(56) References Cited

U.S. PATENT DOCUMENTS 6,379,253 B1 * 4/2002 Nishioka ................ A63F 13/69 463/2
2020/0298123 A1 * 9/2020 Yang ....................... A63F 13/35
(Continued)

FOREIGN PATENT DOCUMENTS

CN 102999679 A 3/2013
CN 105354040 A 2/2016
(Continued)

OTHER PUBLICATIONS

Machine translation of CN-112870709-A (Year: 2021).*
(Continued)

*Primary Examiner* — Allen Chan
(74) *Attorney, Agent, or Firm* — Alleman Hall LLP

(57) ABSTRACT

A game control method, a terminal, a device, and a storage medium. The method comprises: configuring an article backpack for storing a virtual article for a target virtual character, an equipment bar for equipping weapons and equipment and a tool bar for equipping a survival tool; in a case that the target virtual character obtains the survival tool, adding the survival tool into the tool bar; and in a case that the target virtual character triggers a target survival project, controlling the target virtual character to complete the target survival project. According to the method, a new operation mode and a new function mode are added to the character, the article storage pressure of the article backpack is effectively reduced, and the frequency of cleaning the article backpack is reduced.

18 Claims, 6 Drawing Sheets

(58) Field of Classification Search
USPC ........................................................ 463/31
See application file for complete search history.

(56) References Cited

U.S. PATENT DOCUMENTS

| | | | | |
|---|---|---|---|---|
| 2020/0353357 | A1 | 11/2020 | Wan et al. | |
| 2021/0213361 | A1 | 7/2021 | Abecassis | |
| 2021/0291054 | A1 * | 9/2021 | Tian | G06F 3/04817 |
| 2021/0294472 | A1 * | 9/2021 | Pan | A63F 13/42 |

FOREIGN PATENT DOCUMENTS

| | | | | | |
|---|---|---|---|---|---|
| CN | 102999679 | B | | 10/2016 | |
| CN | 109701274 | A | | 5/2019 | |
| CN | 111701237 | A | | 9/2020 | |
| CN | 111803933 | A | | 10/2020 | |
| CN | 112870709 | A | * | 6/2021 | A63F 13/52 |
| CN | 113262484 | A | | 8/2021 | |
| CN | 113476824 | A | | 10/2021 | |
| CN | 113499582 | A | | 10/2021 | |
| CN | 113975801 | A | | 1/2022 | |
| KR | 102113725 | B1 | * | 5/2020 | A63F 13/55 |

OTHER PUBLICATIONS

Machine translation of KR-102113725-B1 (Year: 2020).*

ISA China National Intellectual Property Administration, International Search Report and Written Opinion Issued in Application No. PCT/CN2022/121277, Dec. 27, 2022, WIPO, 11 pages.

China National Intellectual Property Administration, Office Action and Search Report Issued in Application No. 202111322780.8, Apr. 13, 2023, 17 pages.

China National Intellectual Property Administration, Office Action and Search Report Issued in Application No. 202111322780.8, Jun. 30, 2023, 15 pages.

"The Legend of Yinlan, Diablo 2 Remastered Edition: Beginner's guide, buying water, releasing water, mercenaries, and maps," Baidu.com, Available Online at https://haokan.baidu.com/v?pd=wisenatural&vid=11712402082483148060, Uploaded Date Nov. 4, 2021, 2 pages.

"SCUM Scum Game Tips-Chopping Trees," bilibili.com, Available Online at https://www.bilibili.com/video/av753943782/?vd_618el50331eabf5a9fel05ad784ec33d, Uploaded Date Jul. 18, 2020, 3 pages.

Dz0101, "Ping Elite Extreme Cold Mode Tutorial: Get started in five minutes! PlayerUnknown's Battlegrounds, mobile chicken game, exciting battlefield," bilibili.com, Available Online at https://www.bilibili.com/video/av85722294/, Uploaded Date Jan. 29, 2020, 3 pages.

Rickyfresh, "Diablo 2 Remastered Belt and Potion," lofter.com, Available Online at http://yourfox1.lofter.com/post/197a87_1cd18c54c, Uploaded Date Sep. 23, 2021, 3 pages.

* cited by examiner

GAME CONTROLLING METHOD, TERMINAL, DEVICE, AND STORAGE MEDIUM

CROSS REFERENCE TO RELATED APPLICATIONS

The present application is a national stage of the International application PCT/CN2022/121277, filed on Sep. 9, 2022. This International application claims a priority right to the Chinese patent application No. 202111322780.8 entitled "Game Controlling Method, Terminal, Device, and Storage Medium" filed with the Chinese Patent Office on Nov. 9, 2021. All of these applications are hereby incorporated by reference in their entireties.

FIELD

The present disclosure relates to the technical field of games, and specifically to a game controlling method, a terminal, a device, and a storage medium.

BACKGROUND

With the development and progress of the times, games have become one of people's main entertainment ways in the time after work and study. Appropriate games may not only train people to make judgment and thinking of surrounding things faster and have a more sensitive response to things, but also release the intangible pressure in work and life and provide stable emotions. Among various games, survival-type role-playing games are enjoyed by many players because of their high playability, strong involvement and skillfulness.

During a gameplay, a character will collect many virtual items, survival items, equipment and drugs in the game for factors such as the game progress, game needs and scenario needs. As the character collects more and more items, the items will take up a lot of virtual backpack space, so that the character's virtual backpack space is insufficient. Most processing methods are that the player needs to actively choose to discard the items and clear the backpack. The clearing is cumbersome and complex, the convenience in managing items is undesirable, and a lot of time and energy is consumed.

SUMMARY

Embodiments of the present disclosure at least provide a game controlling method, a terminal, an apparatus, and a storage medium.

Embodiments of the present disclosure provide a game controlling method applied to a terminal provided with a graphic user interface having displayed therein at least a part of a game scene and a target virtual character in the game scene, the target virtual character being provided with an item backpack for storing virtual items, an equipment bar for equipping weapon equipment, and a toolbar for equipping survival tools, the method comprising:

in a case where the target virtual character acquires a survival tool, adding the survival tool into the toolbar in response to a user's first preset operation for the survival tool;

in a case where the target virtual character triggers a target survival project, providing, in the graphical user interface, a survival activity control matched with the target survival project if a target survival tool adapted to the target survival project has been added in the toolbar;

controlling the target virtual character to complete the target survival project in response to a second preset operation for the survival activity control.

In an optional implementation, the method further comprises:

presenting the toolbar and a plurality of the survival tools added in the toolbar in response to a third preset operation for the target virtual character;

presenting tool information of the survival tool at a location corresponding to the survival tool.

In an optional implementation, after the presenting the toolbar and a plurality of the survival tools added in the toolbar in response to a third preset operation for the target virtual character, the method further comprises:

providing a tool appearance displaying control in the toolbar;

displaying a character image of the target virtual character provided with the survival tool in response to triggering the tool appearance displaying control.

In an optional implementation, the toolbar comprises an equipment area and a storage area, and the method further comprises:

moving the survival tool in the equipment area into the storage area to unload the survival tool in response to a fourth preset operation for the survival tool in the equipment area; and/or moving the survival tool in the storage area into the equipment area to equip the survival tool in response to a fifth preset operation for the survival tool in the storage area.

In an optional implementation, after determining that a target survival tool adapted to the target survival project has been added in the toolbar, the method further comprises:

switching the target survival tool to the equipment area so that the target virtual character is equipped with the survival tool if the target survival tool is located at the storage area.

In an optional implementation, the method further comprises:

detecting scene information in a game scene where the target virtual character is located, wherein the scene information comprises at least one of location information, environment information, and game progress information, the environmental information comprises one or more of a cold environment, a hot environment, a dark environment, a highly toxic environment, a windy environment, a rainy and snowy environment, and an arid environment;

determining at least one of the survival tools out of the toolbar adapted to the scene information;

providing the determined at least one of the survival tools in the equipment area.

In an optional implementation, the step of, in a case where the target virtual character acquires a survival tool, adding the survival tool into the toolbar in response to a user's first preset operation for the survival tool comprises:

in a case where the target virtual character acquires the survival tool, detecting whether there is a vacant bar location in the toolbar;

adding the survival tool into the toolbar if there is the vacant bar location in the toolbar.

In an optional implementation, the step of, in a case where the target virtual character acquires a survival tool, adding the survival tool into the toolbar in response to a user's first preset operation for the survival tool comprises:

in a case where the target virtual character acquires the survival tool, adding the survival tool into the item backpack;

adding the survival tool into the toolbar in response to the user's first preset operation for the survival tool in the item backpack.

In an optional implementation, the controlling the target virtual character to complete the target survival project in response to a second preset operation for the survival activity control comprises:

controlling the target virtual character to switch a piece of equipment in use to the target survival tool in response to the second preset operation for the survival activity control;

controlling the target virtual character to use the target survival tool to complete project content of the target survival project.

Embodiments of the present disclosure further provide a terminal having provided thereon a graphical user interface having displayed therein at least a part of a game scene and a target virtual character in the game scene, the target virtual character being provided with an item backpack for storing virtual items, an equipment bar for equipping weapon equipment, and a toolbar for equipping survival tools, the terminal comprising:

a tool adding module for, in a case where the target virtual character acquires a survival tool, adding the survival tool into the toolbar in response to a user's first preset operation for the survival tool;

a control providing module for, in a case where the target virtual character triggers a target survival project, providing, in the graphical user interface, a survival activity control matched with the target survival project if a target survival tool adapted to the target survival project has been added in the toolbar;

a character controlling module for controlling the target virtual character to complete the target survival project in response to a second preset operation for the survival activity control.

In an optional implementation, the terminal further comprises a tool information presenting module for:

presenting the toolbar and a plurality of the survival tools added in the toolbar in response to a third preset operation for the target virtual character;

presenting tool information of the survival tool at a location corresponding to the survival tool.

In an optional implementation, the terminal further comprises a tool appearance displaying module for:

providing a tool appearance displaying control in the toolbar;

displaying a character image of the target virtual character provided with the survival tool in response to triggering the tool appearance displaying control.

In an optional implementation, the toolbar comprises an equipment area and a storage area, and the terminal further comprises a tool moving module for:

in response to a fourth preset operation for the survival tool in the equipment area, moving the survival tool in the equipment area into the storage area to unload the survival tool; and/or in response to a fifth preset operation for the survival tool in the storage area, move the survival tool in the storage area into the equipment area to equip the survival tool.

In an optional implementation, the tool moving module is further configured to:

switch the target survival tool to the equipment area so that the target virtual character is equipped with the survival tool if the target survival tool is located at the storage area.

In an optional implementation, the tool moving module is further configured to:

detect scene information in a game scene where the target virtual character is located, wherein the scene information comprises at least one of location information, environment information, and game progress information, the environmental information comprises one or more of a cold environment, a hot environment, a dark environment, a highly toxic environment, a windy environment, a rainy and snowy environment, and an arid environment;

determine at least one of the survival tools out of the toolbar adapted to the scene information;

provide the determined at least one of the survival tools in the equipment area.

In an optional implementation, the tool adding module is specifically configured to:

in a case where the target virtual character acquires the survival tool, detect whether there is a vacant bar location in the toolbar;

add the survival tool into the toolbar if there is the vacant bar location in the toolbar.

In an optional implementation, the tool adding module is specifically configured to:

in a case where the target virtual character acquires the survival tool, add the survival tool to the item backpack;

add the survival tool into the toolbar in response to the user's first preset operation for the survival tool in the item backpack.

In an optional implementation, the character controlling module is specifically configured to:

control the target virtual character to switch a piece of equipment in use to the target survival tool in response to the second preset operation for the survival activity control;

control the target virtual character to use the target survival tool to complete project content of the target survival project.

Embodiments of the present disclosure further provide an electronic device, comprising a processor, a memory, and a bus, the memory storing machine readable instructions executable by the processor; when the electronic device is running, the processor communicates with the memory via the bus, so that the machine executable instructions, when executed by the processor, perform the steps of the above game controlling method.

Embodiments of the present disclosure further provide a computer-readable storage medium having stored thereon a computer program which, when executed by a processor, performs the steps of the above game controlling method.

Embodiments of the present disclosure further provide a computer program that, when executed by a processor, performs the steps of the above game controlling method.

Embodiments of the present disclosure further provide a computer program product comprising a computer program which, when run by a processor, perform the steps of the above game controlling method.

By the game controlling method, a terminal, a device, and a storage medium according to embodiments of the present disclosure, the target virtual character is provided with the item backpack for storing virtual items, the equipment bar for equipping weapon equipment and the toolbar for equipping survival tools; in the case where the target virtual character acquires a survival tool, the survival tool is added to the toolbar in response to the user's first preset operation for the survival tool; in the case where the target virtual character triggers a target survival project, a survival activity control matched with the target survival project is provided in the graphical user interface if a target survival tool adapted to the target survival project has been added in the toolbar; the target virtual character is controlled to complete the target survival project in response to a second preset operation for the survival activity control.

As such, by configuring the toolbar for equipping a character with a survival tool and increasing new manners of storing and equipping items in classes, it is possible to not only add new operation modes and function modes for the characters, but also effectively reduce the pressure of storing items in the backpack, release more storage space, effectively reduce the frequency of clearing the backpack, help release the player's more gaming energy, increase effective gaming time and improve the playability.

To make the above objects, features and advantages of the present disclosure more apparent, the present disclosure will be described in detail below by taking preferred embodiments as examples with reference to accompanying drawings.

BRIEF DESCRIPTION OF THE DRAWINGS

To describe the technical solutions of embodiments of the present disclosure more clearly, the figures to be used in the embodiments will be introduced briefly below. The figure, which are incorporated in and constitute a part of the description, illustrate embodiments of the present disclosure and, together with the description, serve to explain the principles of the present disclosure. It is to be understood that the figures depict only certain embodiments of the present disclosure and are therefore not to be considered as limiting the scope. Those having ordinary skill in the art may also obtain other relevant figures according to these figures without making any inventive efforts.

DETAILED DESCRIPTION OF EMBODIMENTS

Figure 1:
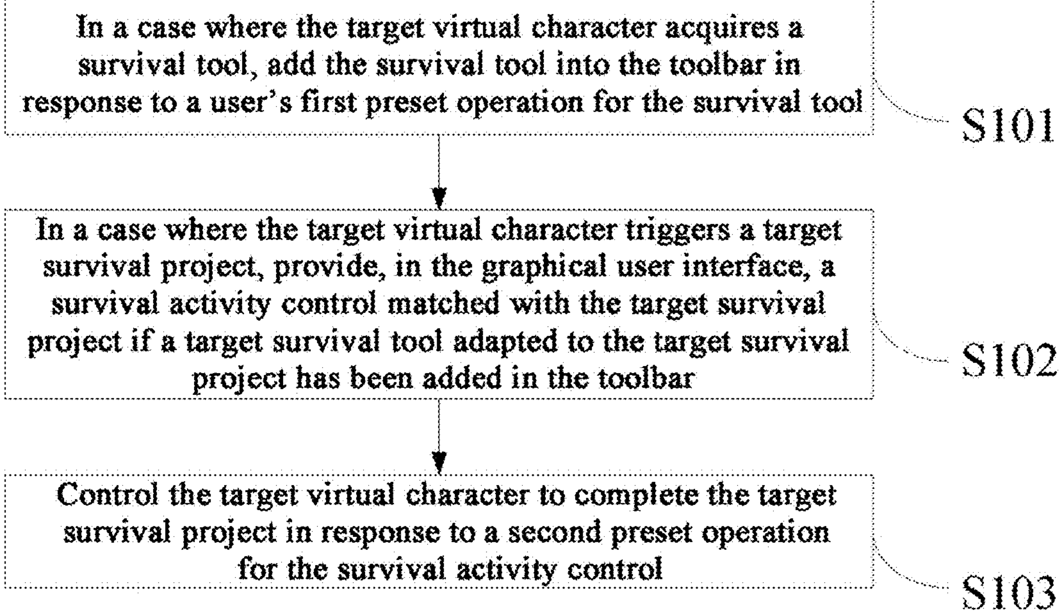
FIG. 1 is a flow chart of a game controlling method provided by an embodiment of the present disclosure.

To make the objectives, technical solutions and advantages of embodiments of the present disclosure more apparent, the technical solutions in embodiments in the present disclosure will be described below clearly and completely with reference to figures in the embodiments of the disclosure. Obviously, the described embodiments are only partial embodiments in the disclosure rather than all embodiments. Usually, the components of the embodiments of the present disclosure described and shown in the figures here may be arranged and designed in various different configurations. Hence, the following detailed depictions of embodiments of the present disclosure provided in the figures are not intended to limit the scope of the present disclosure, and only illustrate the selected embodiments of the present disclosure. All other embodiments obtained by those skilled in the art without making inventive efforts based on the embodiments in the present disclosure should fall within the scope of protection of the present disclosure.

It should be noted that like numbers and letters refer to like items in the following figures, and thus, once an item is defined in one figure, it needn't be further defined and explained in subsequent figures.

The term "and/or", as used herein, merely describes an association relationship and means that there may be three relationships, for example, A and/or B may indicate three cases: A exists alone, A and B exist simultaneously, and B exists alone. In addition, the term "at least one" herein means any one of the plurality or any combination of at least two of the plurality, for example, "including at least one of A, B and C" may mean including any one element or more elements selected from a set constituted by A, B and C.

It is found from research that a character in the game will collect many virtual items, survival items, equipment and drugs in the game for factors such as the game progress, game needs and scenario needs. As the character collects more and more items, the items will take up a lot of virtual backpack space, so that the character's virtual backpack space is insufficient. Most processing methods are that the player needs to actively choose to discard the items and clear the backpack. The clearing is cumbersome and complex, the convenience in managing items is undesirable, and a lot of time and energy is consumed.

Based on the above research, the present disclosure provides a game controlling method. With a toolbar for equipping a character with a survival tool being configured, the obtained survival tools may be added and equipped to a survival bar, a corresponding survival tool may be used in different scenarios, new manners of storing and equipping items in classes are added in the gaming mechanism. As such, it is possible to not only add new operation modes and function modes for the characters, but also effectively reduce the pressure of storing items in the backpack, release more storage space, effectively reduce the frequency of clearing the backpack, help release the player's more gaming energy, increase effective gaming time and improve the playability.

To help understand the present embodiment, a game controlling method according to an embodiment of the present disclosure will first be described in detail. A subject of executing the game controlling method according to the embodiment of the present disclosure is generally a computer device having a certain computing capability. The computer device for example includes: a terminal device, a server or other processing device. The terminal device may be a User Equipment (UE), a mobile device, a user terminal, a terminal, a cellular phone, a cordless phone, a Personal Digital Assistant (PDA), a handheld device, a computing device, an in-vehicle device, a wearable device, etc. In some optional implementations, the game controlling method may be implemented by a processor invoking computer-readable instructions stored in a memory.

Referring to FIG. 1, it is a flow chart of a game controlling method according to an embodiment of the present disclosure. The game controlling method provided by the embodiment of the present disclosure may be applied to a terminal provided with a graphic user interface. In the graphic user interface are displayed at least part of a game scene and a target virtual character in the game scene. The target virtual character is equipped with an item backpack for storing virtual items, an equipment bar for equipping weapon equipment, and a toolbar for equipping survival tools.

The item backpack may be a portable storage space owned by a target virtual character in the game, and may also be a portable storage space composed of the storage space of the target virtual character itself and a prop with a space expansion function carried by the character. For example, in a game system, a player character would be provided with a certain number of storage bars to allow the character to place game equipment, game props and game items, etc. Any items, weapon equipment, survival props, survival equipment, drugs, etc. which can be gained by the target virtual character in the game all may be stored in the item backpack, and meanwhile the item backpack also displays the amount of money held by the character.

Once the character's storage bar is full, the player can no longer place any props in the backpack space (storage space), whereupon the player must decide whether to discard, sell, or store items in a personal warehouse (a storage space which is arranged at a fixed location and owned by the target virtual character in the game). In accordance with the settings of the individual gaming systems, some props may expand the storage bar on the body, and these props are often designed like props such as backpacks, travelling bags, waist bags, and the like. Sometimes, players need to spend certain game coins to expand the backpack space on the body.

Correspondingly, in most games, the target virtual character is further provided with an equipment bar. The equipment bar is also a portable storage space owned by the target virtual character in the game, or a portable storage space composed of the storage space of the target virtual character itself and a prop with a space expansion function carried by the character. Unlike the item backpack, the equipment bar may only store weapon equipment of the target virtual character. The weapon equipment may refer to props affecting attribute data and combat capability of game characters, for example, weapons such as knives, guns, swords, halberds, rocket launchers, submachine guns, etc., and protective items such as clothing, helmets, shoes and waistbands worn by characters, and ornaments such as rings, necklaces, etc. worn by characters, and even some equipment with special functions, such as pet equipment, armour equipment, carrier equipment, etc. worn by pets.

Correspondingly, the weapon equipment in the equipment bar may be transferred from the item backpack, for example, the weapon equipment are moved from the item backpack to a specific area in the equipment bar to equip the weapons, thereby enabling the character to be additionally provided with attribute data and additional effects of the weapon equipment. Furthermore, the weapon equipment in the equipment bar may also be moved into the item backpack, thereby removing the weapons carried by the character so that the character loses the attributes of the removed weapons.

Furthermore, in the embodiment of the present disclosure, a toolbar is also configured for the target virtual character, and mainly used for storing and equipping survival tools obtained by the target virtual character. The toolbar is also a portable storage space owned by the target virtual character in the game, or a portable storage space composed of the storage space of the target virtual character itself and a prop with a space expansion function carried by the character. Unlike the item backpack, the toolbar may only store the survival tools of the target virtual character.

The survival tools may refer to props which cannot provide attribute data and additional effects for the target virtual character for behaviors such as fighting and moving, but can be applied upon a specific scene or the presence of a special item, to maintain the life value of the target virtual character, strengthen a certain attribute or obtain a specific item, for example, auxiliary props such as an axe used when the target virtual character needs to cut a tree, a poison gas mask for poison gas protection in a poison gas environment, a torch used for illumination in a dark environment, a pick used for mining, etc.

Correspondingly, the survival tools in the toolbar may be transferred from the item backpack, for example, the survival tools are moved from the item backpack to a specific area in the toolbar to equip the survival tools so that characters may use the survival tools to complete non-combat and survival-type game contents. Furthermore, the survival tools in the toolbar may also be moved into the item backpack so as to remove the survival tools carried by the characters.

As shown in FIG. 1, the process comprises:

S101: in a case where the target virtual character acquires a survival tool, adding the survival tool into the toolbar in response to a user's first preset operation for the survival tool.

In this step, in the process of playing a game, the user may manipulate the target virtual character owned by the player to perform an activity in a game scene, for example, complete a corresponding task, and enable the target virtual character to acquire a survival tool through corresponding activities such as the passing of a level, an item trade, an item pick-up, and fighting against monsters. After the survival tool is acquired, the user may equip the survival tool for the target virtual character. Specifically, the user may apply a first pre-set operation with respect to the survival tool, for example, an operation such as clicking or dragging that may achieve movement or equipment. Accordingly, in response to the first preset operation, the survival tool may be added to the toolbar to equip the target virtual character with the survival tool.

The survival tool may refer to a virtual prop used by the target virtual character to cope with different weather environments in a game so as to simulate the survival of a person in a severe weather environment, etc. such as a poison gas mask, a cotton-padded cap, a candle, a torch, a lantern, etc.; the survival tool may also refer to a tool used by the target virtual character to perform living activities in a game, such as a pick for mining, a fishing rod for fishing, a shovel for collecting herbal medicines, an axe required for chopping trees, etc.; the survival tool may also be other tools for performing survival activities in addition to fighting.

The first preset operation may be an operation such as clicking and sliding which acts on the survival tool and/or a control corresponding to the survival tool. The control corresponding to the survival tool may be a control for referring to the survival tool, for example, after the target virtual character acquires the survival tool, he may temporarily store the survival tool in the item backpack. Meanwhile, in order to facilitate the user to learn about and process the survival tool, the control for referring to the survival tool may be provided in the graphical user interface.

Figure 2:
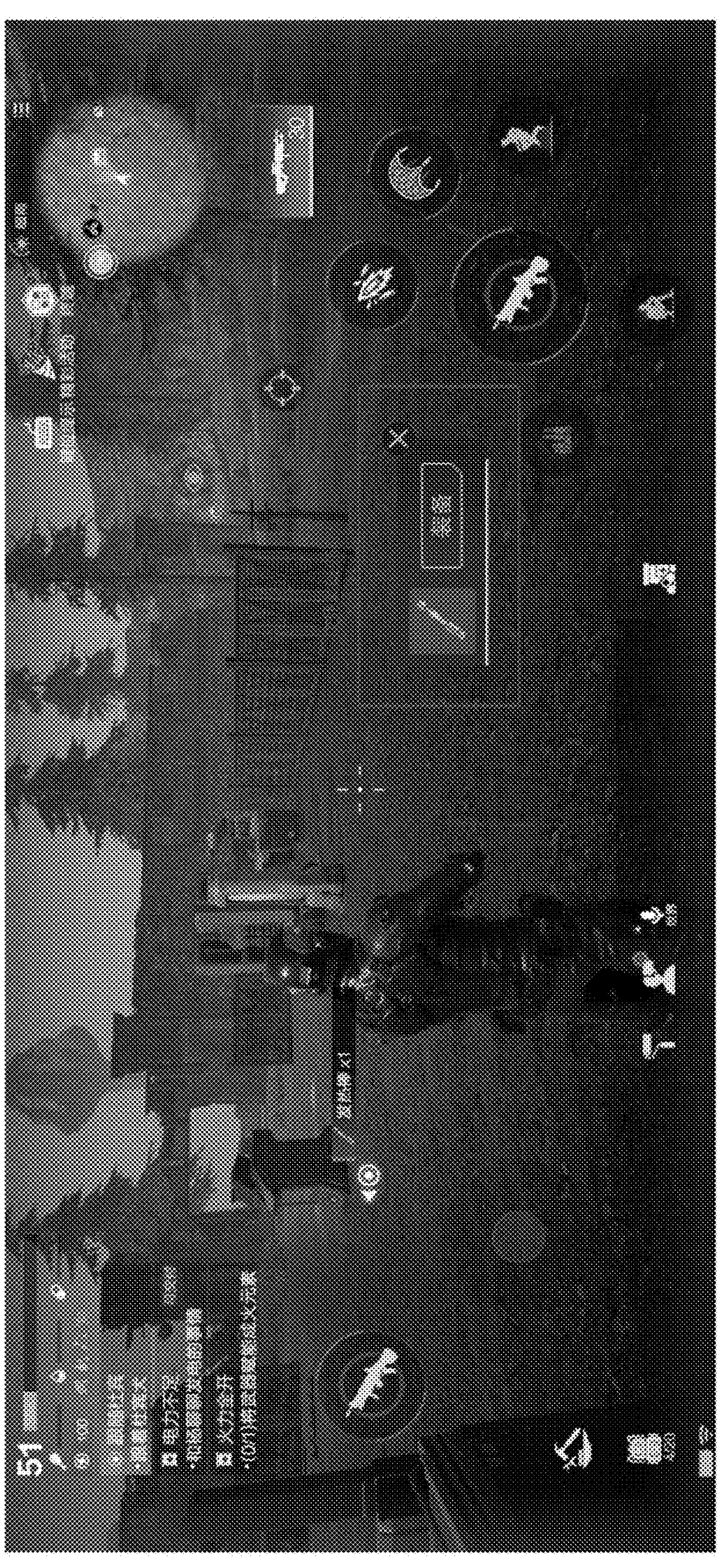
FIG. 2 is a schematic diagram of a graphical user interface.

By way of example, referring to FIG. 2, FIG. 2 is a schematic diagram of a graphical user interface. As shown in FIG. 2, after the survival tool is acquired by the target virtual character, in order to enable a user to clearly know an event that the target virtual character acquires the survival tool, and even to enable the user to clearly know what the acquired survival tool is, and to facilitate the processing of the survival tool by the user, the control of the survival tool may be displayed in the graphical user interface, and a thumbnail icon identification and a handling button, such as an equipment button, of the survival tool may be presented in the control, so that the user may choose to equip the survival tool directly for the target virtual character, add the survival tool into the toolbar.

However, in some cases, the user might not want to process the survival tool when knowing that the target virtual character acquires the survival tool, for example, process the survival tool when the survival tool needs to be used subsequently or when the user is free. Therefore, the survival tool may be temporarily stored in the item backpack, and then be actively processed subsequently.

Correspondingly, in some specific embodiments, S101 comprises:

in a case where the target virtual character acquires the survival tool, adding the survival tool into the item backpack; adding the survival tool into the toolbar in response to the user's first preset operation for the survival tool in the item backpack.

Here, in a case where it is detected that the target virtual character acquires the survival tool, the survival tool may be added to the item backpack for temporary storage; when the user needs to equip the survival tool for the target virtual character or have time to process the survival tool, the first preset operation may be applied to the survival tool in the item backpack to process the survival tool, and accordingly, the survival tool may be added to the toolbar in response to the first preset operation.

Furthermore, in order to simplify or reduce the user's operation, reduce the user's energy consumption and improve the convenience of the game, the survival tool acquired by the target virtual character may be directly processed.

Specifically, in some possible embodiments, S101 comprises:

in a case where the target virtual character acquires the survival tool, detecting whether there is a vacant bar location in the toolbar; adding the survival tool into the toolbar if there is the vacant bar location in the toolbar.

Here, if it is detected that the target virtual character acquires the survival tool, it is preferable to choose to directly store the survival tool into the toolbar, namely, detect whether the vacant bar location is present in the toolbar; the survival tool may be added to the toolbar if there is the vacant bar location in the toolbar.

Conversely, if the vacant bar location is not present in the toolbar, the survival tool may be temporarily stored in the item backpack first, to await the user to process.

Furthermore, the toolbar may comprise an equipment area and a storage area, namely, the toolbar may be divided into the storage area for storing the survival tools and the equipment area for equipping the survival tools for the target virtual character; accordingly, the presence of the vacant bar location in the toolbar may meant that the vacant bar location is present in any partition of the equipment area and the storage area, and that the vacant bar location is present in the storage area only.

S102: in a case where the target virtual character triggers a target survival project, providing, in the graphical user interface, a survival activity control matched with the target survival project if a target survival tool adapted to the target survival project has been added in the toolbar.

In this step, upon performing an activity in the game, the target virtual character triggers the target survival project, for example, a pre-set scenario in a game requiring the character to mine, chop trees, enter a toxic gas area, or encounter a rainstorm, detection may be performed with respect to the props owned by the target virtual character to detect whether the toolbar of the target virtual character is equipped with a target survival tool adapted to the target survival project; if YES, it may be believed that the target virtual character may perform a survival activity corresponding to the target survival project, and thereby provide, in the graphical user interface, a survival activity control matching the target survival project so that the user controls the target virtual character to perform the survival activity.

The toolbar being equipped with the target survival tool may mean that the target survival tool may be stored in the toolbar, and mean that the target survival tool may be stored in the toolbar, and the target virtual character is equipped with the target survival tool.

Further, for the survival activity control, information related to the target survival project, such as the identity, name, etc. of the survival tool used, as well as information of the item itself, etc. may be displayed on the displayed control.

Figure 3:
FIG. 3 is another second schematic diagram of a graphical user interface.

By way of example, reference is made to FIG. 3, which is another schematic diagram of the graphical user interface. As shown in FIG. 3, an example is taken in which the target survival project is mining and the survival tool as a pick, if there is a pick for mining in the equipment bar, a control for mining may be displayed when the target virtual character approaches the ore and wants to mine.

S103: controlling the target virtual character to complete the target survival project in response to a second preset operation for the survival activity control.

In this step, in a case where the user-applied second preset operation for the survival activity control is received, in response to the second preset operation, the target virtual character may be controlled to perform an activity corresponding to the target survival project, such as mining, fishing, entering a toxic gas area, or entering underwater so as to complete corresponding content of the project.

According to the game controlling method provided by an embodiment of the present disclosure, the target virtual character is provided with the item backpack for storing virtual items, the equipment bar for equipping weapon equipment and the toolbar for equipping survival tools; in the case where the target virtual character acquires a survival tool, the survival tool is added to the toolbar in response to the user's first preset operation for the survival tool; in the case where the target virtual character triggers a target survival project, a survival activity control matched with the target survival project is provided in the graphical user interface if a target survival tool adapted to the target survival project has been added in the toolbar; the target virtual character is controlled to complete the target survival project in response to a second preset operation for the survival activity control.

As such, by configuring the toolbar for equipping a character with a survival tool and increasing new manners of storing and equipping items in classes, it is possible to not only add new operation modes and function modes for the characters, but also effectively reduce the pressure of storing items in the backpack, release more storage space, effectively reduce the frequency of clearing the backpack, help release the player's more gaming energy, increase effective gaming time and improve the playability.

Figure 4:
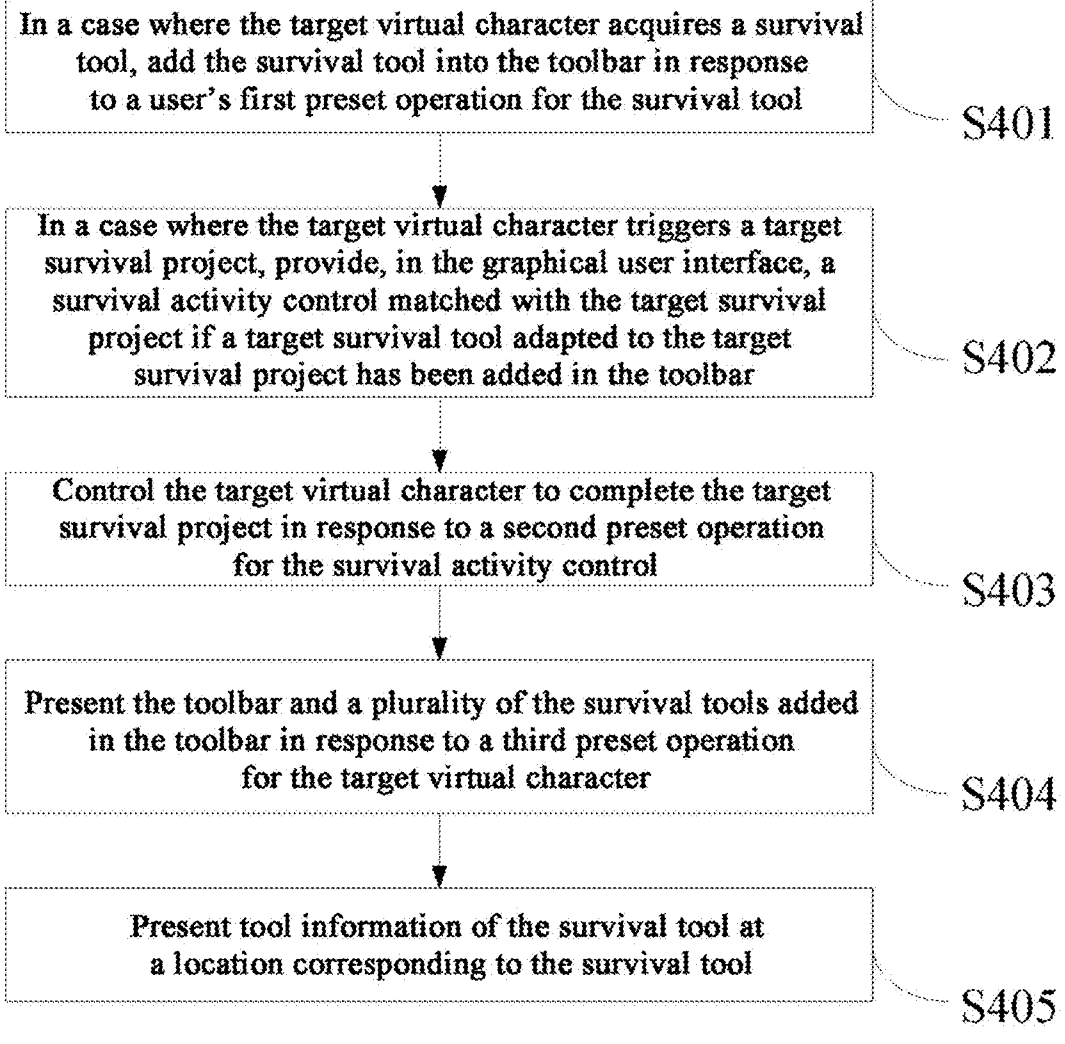
FIG. 4 is a flowchart of another game controlling method provided by an embodiment of the present disclosure.

Referring to FIG. 4, FIG. 4 illustrates a flowchart of another game controlling method according to an embodiment of the present disclosure. The game controlling method provided by the present embodiment of the present disclosure is applied to a terminal provided with a graphic user interface which displays at least a part of a game scene and a target virtual character in the game scene; the target virtual character is provided with an item backpack for storing virtual items, an equipment bar for equipping weapon equipment, and a toolbar for equipping survival tools. As shown in FIG. 4, the method comprises:

S401: in a case where the target virtual character acquires a survival tool, adding the survival tool into the toolbar in response to a user's first preset operation for the survival tool.

S402: in a case where the target virtual character triggers a target survival project, providing, in the graphical user interface, a survival activity control matched with the target survival project if a target survival tool adapted to the target survival project has been added in the toolbar.

S403: controlling the target virtual character to complete the target survival project in response to a second preset operation for the survival activity control.

S404: presenting the toolbar and a plurality of the survival tools added in the toolbar in response to a third preset operation for the target virtual character.

In this step, when the user wants to view the survival tools owned by the target virtual character and/or wants to process the survival tools, the user may apply a third preset operation to the target virtual character, and open the toolbar in response to the third preset operation, to present the toolbar and present a plurality of the survival tools added in the toolbar.

The third preset operation applied to the target virtual character may refer to an operation acting on the target virtual character itself to open the toolbar, and may also refer to an operation acting on the target virtual character in the graphical user interface, or a corresponding location and/or icon on the target virtual character, etc. The third preset operation may be an operation such as click, a long-press, a double-click, etc.

S405: presenting tool information of the survival tool at a location corresponding to the survival tool.

In this step, after the survival tool added in the toolbar is displayed, determination may be further made to display the tool information of the survival tool at a location corresponding to the survival tool, for example, a preset location at the upper right corner of the tool.

Presenting the tool information may be automatically displaying the tool information after presenting the toolbar, or may also be presenting the tool information when the user applies an operation for the survival tool by an operation such as click, or when a control pointer controllable by the user in the game falls on the survival tool.

Reference may be made to the depictions of steps S101 to S103 for the depictions of steps S401 to S403. Steps S401 to S403 may achieve the same technical effect and solve the same technical problem, and will not be described in detail any more.

In some optional implementations, after step S404, the method further comprises:

providing a tool appearance displaying control in the toolbar; displaying a character image of the target virtual character provided with the survival tool in response to triggering the tool appearance displaying control.

In the game, various images may be provided for the target virtual character, such as wearing a corresponding garment to show the appearance of the garment, equipping the target virtual character with a certain weapon to show an image that the character is holding a weapon, which however all generally fall within the category of equipment of the character. Even though in soma games, the character may hold some survival tools, he only equips the tool into the equipment bar as a type of equipment, or uses the corresponding tool for operation only upon performing a corresponding act, with a low freedom.

Correspondingly, in this step, in the process of presenting the toolbar, the tool appearance displaying control may be provided in the toolbar; in a case where the target virtual character is provided with the survival tool in the toolbar, the user may apply a corresponding operation on the tool appearance displaying control so as to trigger the tool appearance displaying control; the character image of the target virtual character provided with the survival tool may be displayed in response to triggering the tool appearance displaying control, so that the target virtual character may switch between a character image provided with corresponding equipment and a character image provided with the survival tool, for example, showing a character image with a gas mask, or a character image holding a pick, etc. and may act in the game with the character image provided with the survival tool. Furthermore, after the user triggers the tool appearance displaying control again, the target virtual character may be switched back to the original image.

In some possible embodiments, the toolbar may be further subdivided into an equipment area and a storage area so that the toolbar comprises the equipment area and the storage area; the storage area is used for storing the survival tools only, and the target virtual character is provided with the survival tools only when the survival tool is located in the equipment area. As such, the toolbar further has a function of storing the survival tools in addition to having the effect of equipping the survival tool. Particularly, in a case of a large variety and number of the survival tools, the space of the item backpack of the target virtual character may be further released.

Correspondingly, the method further comprises:

moving the survival tool in the equipment area into the storage area to unload the survival tool in response to a fourth preset operation for the survival tool in the equipment area.

In this step, regarding the survival tool located in the equipment area, namely, the already-equipped survival tool, the user may cancel the equipping of the survival tool according to needs. Specifically, the fourth preset operation may be applied to the survival tool in the equipment area; in response to the fourth preset operation, the survival tool in the equipment area is moved to the storage area so as to remove the survival tool from the target virtual character, namely, cancel the equipping of the survival tool.

Conversely, the method further comprises:

moving the survival tool in the storage area into the equipment area to equip the survival tool in response to a fifth preset operation for the survival tool in the storage area.

In this step, in a case where the target virtual character obtains the survival tool and temporarily stores it in the storage area, if the user wants to equip the survivor tool, the fifth preset operation may be applied to the survivor tool in the storage area, and in response to the fifth preset operation, the survivor tool in the storage area is moved to the equipment area to equip the survivor tool on the target virtual character.

In this way, free manual equipment and removal of the survival tool may be achieved according to the user's needs, thereby greatly increasing the flexibility of use of the survival tool.

Further, in order to reduce the user's operation amount and save the user's energy to keep the user's attention to the game, after determining that a target survival tool adapted to the target survival project is added to the toolbar, the method further comprises:

switching the target survival tool to the equipment area so that the target virtual character is equipped with the survival tool if the target survival tool is located at the storage area.

In this step, in a case where the target virtual character triggers the target survival project, preferentially detection is performed as to whether a target survival tool matching the target survival project is added to the toolbar. If the target survival tool matching the target survival project is added to the toolbar, and the target survival tool is not located in the equipment area in the toolbar, it may be believed that the target virtual character has owned the target survival tool but not yet equipped the target survival tool. Therefore, the target survival tool may be switched to the equipment area to automatically equip the target virtual character with the target survival tool.

In a game, in some special cases, for example in some special scenarios, there might be more than one survival tool needed by the target virtual character. Therefore, a plurality of the survival tools need to be equipped in order to fully implement protection.

Correspondingly, in some optional implementations, the method further comprises:

detecting scene information in a game scene where the target virtual character is located; determining at least one of the survival tools out of the toolbar adapted to the scene information; providing the determined at least one of the survival tools in the equipment area.

In this step, when the target virtual character acts in the game scene, the scene information about the game scene in which the target virtual character is located may be detected to cope with different game scenes; furthermore, according to the scene information, at least one of the survival tools out of the toolbar adapted to the scene information may be matched for the target virtual character, so that the determined at least one of the survival tools may be provided in the equipment area to equip the target virtual character with the determined at least one of the survival tools.

The scene information comprises at least one of location information, environment information, and game progress information.

The environmental information comprises one or more of a cold environment, a hot environment, a dark environment, a highly toxic environment, a windy environment, a rainy and snowy environment, and an arid environment.

In some optional implementations, step S403 comprises:

controlling the target virtual character to switch a piece of equipment in use to the target survival tool in response to the second preset operation for the survival activity control; controlling the target virtual character to use the target survival tool to complete the project content of the target survival project.

In this step, since the target virtual character appears with an image with weapon equipment and clothing equipment equipped in the game scene most of the time, it may be believed after responding to the second preset operation that the target virtual character needs to perform a corresponding survival activity; in order to better demonstrate the survival activity, the equipment being used by the target virtual character may be switched to the target survival tool, for example, the weapon in the hand is switched to a fishing rod for fishing or an axe for chopping trees, or the helmet worn is switched to a gas mask, a search helmet with a lamp, etc. so as to give the user a better sense of substitution; furthermore, the target virtual character may be controlled to use the target survival tool to complete the project content of the target survival project.

According to the game controlling method provided by an embodiment of the present disclosure, the target virtual character is provided with the item backpack for storing virtual items, the equipment bar for equipping weapon equipment and the toolbar for equipping survival tools; in the case where the target virtual character acquires a survival tool, the survival tool is added to the toolbar in response to the user's first preset operation for the survival tool; in the case where the target virtual character triggers a target survival project, a survival activity control matched with the target survival project is provided in the graphical user interface if a target survival tool adapted to the target survival project has been added in the toolbar; the target virtual character is controlled to complete the target survival project in response to a second preset operation for the survival activity control; the toolbar and a plurality of the survival tools added in the toolbar are presented in response to a third preset operation for the target virtual character; tool information of the survival tool is presented at a location corresponding to the survival tool.

As such, by configuring the toolbar for equipping a character with a survival tool, increasing new manners of storing and equipping items in classes and presenting tool information in the toolbar, it is possible to not only add new operation modes and function modes for the characters, but also effectively reduce the pressure of storing items in the backpack, release more storage space, effectively reduce the frequency of clearing the backpack, help release the player's more gaming energy, increase effective gaming time and improve the playability.

It will be appreciated by those skilled in the art that the order in which the steps are written in the methods described above for the specific implementations does not mean any limitations of the implementation process in a strict order of execution, and that the specific order of execution of the steps should be determined in terms of their functionality and possible inherent logic.

Based on the same inventive concept, a terminal corresponding to the game controlling method is also provided in the embodiments of the present disclosure. Since the principle of the terminal solving the problem in the embodiments of the present disclosure is similar to the above-mentioned game controlling method in the embodiments of the present disclosure, reference may be made to the implementation of the method for the implementation of the terminal. Detailed depictions will not be presented any more here.

Figure 5:
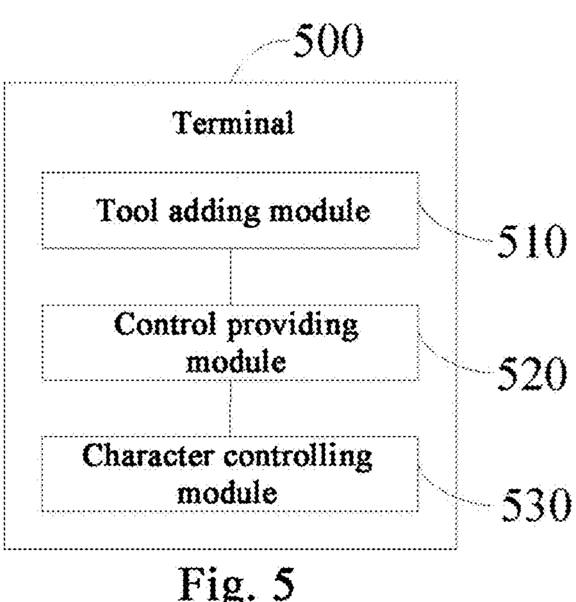
FIG. 5 is a schematic diagram of a terminal provided by an embodiment of the present disclosure.
Figure 6:
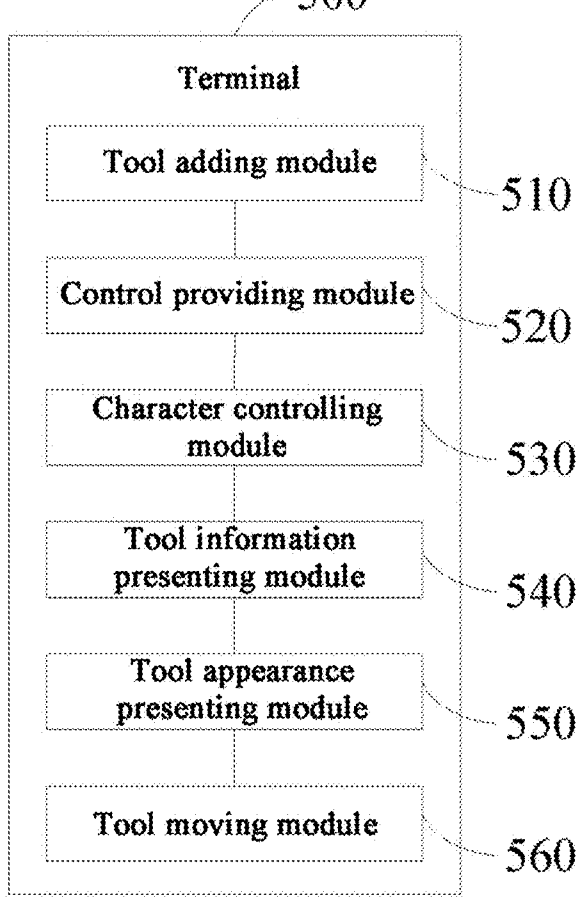
FIG. 6 is another schematic diagram of a terminal provided by an embodiment of the present disclosure.

Referring to FIG. 5 and FIG. 6, FIG. 5 is a schematic diagram of a terminal provided by an embodiment of the present disclosure, and FIG. 6 is another schematic diagram of a terminal provided by an embodiment of the present disclosure. A terminal 500 provided by an embodiment of the present disclosure is provided with a graphical user interface in which at least a part of a game scene and a target virtual character in the game scene are displayed, the target virtual characters are provided with an item backpack for storing virtual items, an equipment bar for equipping weapon equipment, and a toolbar for equipping survival tools. As shown in FIG. 5, the terminal 500 comprises:

a tool adding module 510 configured to, in a case where the target virtual character acquires a survival tool, add the survival tool into the toolbar in response to a user's first preset operation for the survival tool;

a control providing module 520 configured to, in a case where the target virtual character triggers a target survival project, provide, in the graphical user interface, a survival activity control matched with the target survival project if a target survival tool adapted to the target survival project has been added in the toolbar;

a character controlling module 530 configured to control the target virtual character to complete the target survival project in response to a second preset operation for the survival activity control.

In an optional implementation, as shown in FIG. 6, the terminal 500 further comprises a tool information presenting module 540 configured to:

present the toolbar and a plurality of the survival tools added in the toolbar in response to a third preset operation for the target virtual character;

present tool information of the survival tool at a location corresponding to the survival tool.

In an optional implementation, as shown in FIG. 6, the terminal 500 further comprises a tool appearance displaying module 550 configured to:

provide a tool appearance displaying control in the toolbar;

display a character image of the target virtual character provided with the survival tool in response to triggering the tool appearance displaying control.

In an optional implementation, as shown in FIG. 6, the toolbar comprises an equipment area and a storage area, and the terminal 500 further comprises a tool moving module 560 configured to:

in response to a fourth preset operation for the survival tool in the equipment area, move the survival tool in the equipment area into the storage area to unload the survival tool; and/or in response to a fifth preset operation for the survival tool in the storage area, move the survival tool in the storage area into the equipment area to equip the survival tool.

In an optional implementation, the tool moving module 560 is further configured to:

switch the target survival tool to the equipment area so that the target virtual character is equipped with the survival tool if the target survival tool is located at the storage area.

In an optional implementation, the tool moving module 560 is further configured to:

detect scene information in a game scene where the target virtual character is located, wherein the scene information comprises at least one of location information, environment information, and game progress information, the environmental information comprises one or more of a cold environment, a hot environment, a dark environment, a highly toxic environment, a windy environment, a rainy and snowy environment, and an arid environment;

determine at least one of the survival tools out of the toolbar adapted to the scene information;

provide the determined at least one of the survival tools in the equipment area.

In an optional implementation, the tool adding module 510 is specifically configured to:

in a case where the target virtual character acquires the survival tool, detect whether there is a vacant bar location in the toolbar;

add the survival tool into the toolbar if there is the vacant bar location in the toolbar.

In an optional implementation, the tool adding module 510 is specifically configured to:

in a case where the target virtual character acquires the survival tool, add the survival tool to the item backpack;

add the survival tool into the toolbar in response to the user's first preset operation for the survival tool in the item backpack.

In an optional implementation, the character controlling module 530 is specifically configured to:

control the target virtual character to switch a piece of equipment in use to the target survival tool in response to the second preset operation for the survival activity control;

control the target virtual character to use the target survival tool to complete project content of the target survival project.

By the terminal provided by the embodiment of the present disclosure, the target virtual character is provided with the item backpack for storing virtual items, the equipment bar for equipping weapon equipment and the toolbar for equipping survival tools; in the case where the target virtual character acquires a survival tool, the survival tool is added to the toolbar in response to the user's first preset operation for the survival tool; in the case where the target virtual character triggers a target survival project, a survival activity control matched with the target survival project is provided in the graphical user interface if a target survival tool adapted to the target survival project has been added in the toolbar; the target virtual character is controlled to complete the target survival project in response to a second preset operation for the survival activity control.

As such, by configuring the toolbar for equipping a character with a survival tool and increasing new manners of storing and equipping items in classes, it is possible to not only add new operation modes and function modes for the characters, but also effectively reduce the pressure of storing items in the backpack, release more storage space, effectively reduce the frequency of clearing the backpack, help release the player's more gaming energy, increase effective gaming time and improve the playability.

Reference may be made to relevant depictions of the method embodiments for the depictions of the process flow of the modules in the apparatus, as well as the interaction flow between the modules. Detailed depictions will not be presented any more here.

Figure 7:
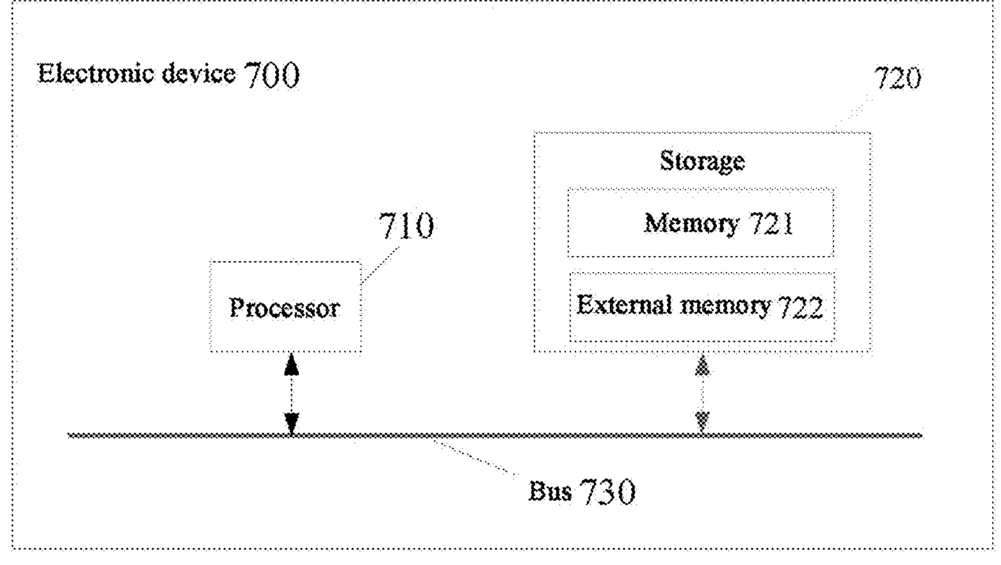
FIG. 7 is a schematic diagram of an electronic device provided by an embodiment of the present disclosure.

Corresponding to the game controlling method shown in FIG. 1 and FIG. 4, the embodiment of the present disclosure also provides an electronic device 700. As shown in FIG. 7, it illustrates a schematic diagram of an electronic device 700 according to an embodiment of the present disclosure, comprising:

a processor 710, a storage 720, and a bus 730; the storage 720 is used for storing executable instructions, and comprises a memory 721 and an external memory 722; the memory 721 is also referred to as an internal storage, and is used for temporarily storing operation data in the processor 710 and data exchanged with the external memory 722 such as a hard disk; the processor 710 exchanges data with the external memory 722 via the memory 721; when the electronic device 700 is running, the processor 710 communicates with the storage 720 via the bus 730, so that the processor 710 executes the steps of the game controlling method in the above-mentioned method embodiment.

Embodiments of the present disclosure further provide a computer-readable storage medium having stored thereon a computer program which, when executed by a processor, performs the steps of the game controlling method described in the above-mentioned method embodiments. The storage medium may be a volatile or non-volatile computer-readable storage medium.

Embodiments of the present disclosure further provide a computer program that, when executed by a processor, performs the steps of the game controlling method described in the above method embodiments.

Embodiments of the present disclosure further provide a computer program product carrying program code comprising instructions operable to perform the steps of the game controlling method described in the above-described method embodiments. For details, please refer to the above method embodiment. Detailed depictions will not be presented any more here.

The computer program product may be embodied in hardware, software, or a combination thereof. In an optional implementation, the computer program product is embodied in a computer storage medium; in another optional implementation, the computer program product is embodied in a software product, such as a Software Development Kit (SDK) or the like.

It will be clear to those skilled in the art that, for convenience and brevity of description, reference may be made to the corresponding processes in the above-described method embodiments for a specific operation process of the system and apparatus described above. Detailed depictions will not be presented any more here. In several embodiments provided by the present disclosure, it should be understood that the disclosed system, apparatus and method may be implemented in other ways. The embodiments of the apparatus described above are merely illustrative, e.g., the division of units is merely a type of logical function division, and the units may be divided in other manners upon actual implementation. As another example, a plurality of units or components may be combined or integrated into another system, or some features may be omitted, or not performed. In another aspect, In addition, mutual coupling or direct coupling or communicative connection as displayed or discussed may be indirect coupling or communicative connection performed via some interfaces, and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit.

The functions, if implemented in software functional units and sold or used as a stand-alone product, may be stored in a non-volatile computer-readable storage medium executable by a processor. Based on such an understanding, the technical solutions of the present disclosure, either inherently or in any part contributing to the prior art, may be embodied in the form of a software product stored in a storage medium, including several instructions to instruct a computer device (a personal computer, server, or network equipment, etc.) to perform all or some steps of the method described in the various embodiments of the present disclosure. The aforementioned storage medium includes various media that may store program codes, such as U disk, removable hard disk, Read-Only Memory (ROM), a Random Access Memory (RAM), a magnetic disk, or an optical disk.

Finally, it is appreciated that the above embodiments are only specific implementations of the present disclosure, and used to illustrate the technical solutions of the present disclosure, not to limit them; the protection scope of the present disclosure is not limited thereto. Although the present disclosure is described in detail with reference to the above embodiments, any person skilled in the art, within the technical scope of the present disclosure, can still make modifications or readily think of changes to the technical solutions described in the above-mentioned embodiments, or make equivalent substitutions for some of the technical features therein; such modifications, changes, and substitutions are intended to be included within the scope of the present disclosure without departing from the spirit and scope of the embodiments of the present disclosure. Therefore, the scope of the disclosure should be determined with reference to the appended claims.

What is claimed is:

1. A game controlling method applied to a terminal provided with a graphic user interface having displayed therein at least a part of a game scene and a target virtual character in the game scene, the target virtual character being provided with an item backpack for storing virtual items, an equipment bar for equipping weapon equipment, and a toolbar for equipping survival tools, the method comprising:

in a case where the target virtual character acquires a survival tool, adding the survival tool into the toolbar in response to a user's first preset operation for the survival tool, comprising:

detecting whether there is a vacant bar location in the toolbar; and adding the survival tool into the toolbar if there is the vacant bar location in the toolbar, or storing the survival tool in the item backpack if there is no vacant bar location in the toolbar;

in a case where the target virtual character triggers a target survival project, providing, in the graphical user interface, a survival activity control matched with the target survival project if a target survival tool adapted to the target survival project has been added in the toolbar; and controlling the target virtual character to complete the target survival project in response to a second preset operation for the survival activity control.

2. The method according to claim 1, wherein the method further comprises:

presenting the toolbar and a plurality of the survival tools added in the toolbar in response to a third preset operation for the target virtual character; and presenting tool information of the survival tool at a location corresponding to the survival tool.

3. The method according to claim 2, wherein after the presenting the toolbar and a plurality of the survival tools added in the toolbar in response to a third preset operation for the target virtual character, the method further comprises:

providing a tool appearance displaying control in the toolbar; and displaying a character image of the target virtual character provided with the survival tool in response to triggering the tool appearance displaying control.

4. The method according to claim 1, wherein the toolbar comprises an equipment area and a storage area, and the method further comprises:

moving the survival tool in the equipment area into the storage area to unload the survival tool in response to a fourth preset operation for the survival tool in the equipment area; and/or moving the survival tool in the storage area into the equipment area to equip the survival tool in response to a fifth preset operation for the survival tool in the storage area.

5. The method according to claim 4, wherein after determining that a target survival tool adapted to the target survival project has been added in the toolbar, the method further comprises:

switching the target survival tool to the equipment area so that the target virtual character is equipped with the survival tool if the target survival tool at located in the storage area.

6. The method according to claim 4, wherein the method further comprises:

detecting scene information in a game scene where the target virtual character is located, the scene information comprises at least one of location information, environment information, and game progress information, the environmental information comprises one or more of a cold environment, a hot environment, a dark environment, a highly toxic environment, a windy environment, a rainy and snowy environment, and an arid environment;

determining at least one of the survival tools out of the toolbar adapted to the scene information; and providing the determined at least one of the survival tools in the equipment area.

7. The method according to claim 1, wherein in a case where the target virtual character acquires a survival tool, adding the survival tool into the toolbar in response to a user's first preset operation for the survival tool further comprises:

after storing the survival tool in the item backpack, adding the survival tool into the toolbar in response to the user's first preset operation for the survival tool in the item backpack.

8. The method according to claim 1, wherein the controlling the target virtual character to complete the target survival project in response to a second preset operation for the survival activity control comprises:

controlling the target virtual character to switch a piece of equipment in use to the target survival tool in response to the second preset operation for the survival activity control; and controlling the target virtual character to use the target survival tool to complete project content of the target survival project.

9. An electronic device, comprising a processor, a memory and a bus, the memory storing machine readable instructions executable by the processor; when the electronic device is running, the processor communicates with the memory via the bus, so that the machine executable instructions, when executed by the processor, perform the steps of a game controlling method applied to a terminal provided with a graphic user interface having displayed therein at least a part of a game scene and a target virtual character in the game scene, the target virtual character being provided with an item backpack for storing virtual items, an equipment bar for equipping weapon equipment, and a toolbar for equipping survival tools, the method comprising:

in a case where the target virtual character acquires a survival tool, adding the survival tool into the toolbar in response to a user's first preset operation for the survival tool, comprising:

detecting whether there is a vacant bar location in the toolbar; and adding the survival tool into the toolbar if there is the vacant bar location in the toolbar, or storing the survival tool in the item backpack if there is no vacant bar location in the toolbar;

in a case where the target virtual character triggers a target survival project, providing, in the graphical user interface, a survival activity control matched with the target survival project if a target survival tool adapted to the target survival project has been added in the toolbar; and controlling the target virtual character to complete the target survival project in response to a second preset operation for the survival activity control.

10. The electronic device according to claim 9, wherein the method further comprises:

presenting the toolbar and a plurality of the survival tools added in the toolbar in response to a third preset operation for the target virtual character; and presenting tool information of the survival tool at a location corresponding to the survival tool.

11. The electronic device according to claim 10, wherein after the presenting the toolbar and a plurality of the survival tools added in the toolbar in response to a third preset operation for the target virtual character, the method further comprises:

providing a tool appearance displaying control in the toolbar; and displaying a character image of the target virtual character provided with the survival tool in response to triggering the tool appearance displaying control.

12. The electronic device according to claim 9, wherein the toolbar comprises an equipment area and a storage area, and the method further comprises:

moving the survival tool in the equipment area into the storage area to unload the survival tool in response to a fourth preset operation for the survival tool in the equipment area; and/or moving the survival tool in the storage area into the equipment area to equip the survival tool in response to a fifth preset operation for the survival tool in the storage area.

13. The electronic device according to claim 12, wherein after determining that a target survival tool adapted to the target survival project has been added in the toolbar, the method further comprises:

switching the target survival tool to the equipment area so that the target virtual character is equipped with the survival tool if the target survival tool at located in the storage area.

14. The electronic device according to claim 12, wherein the method further comprises:

detecting scene information in a game scene where the target virtual character is located, the scene information comprises at least one of location information, environment information, and game progress information, the environmental information comprises one or more of a cold environment, a hot environment, a dark environment, a highly toxic environment, a windy environment, a rainy and snowy environment, and an arid environment;

determining at least one of the survival tools out of the toolbar adapted to the scene information; and providing the determined at least one of the survival tools in the equipment area.

15. The electronic device according to claim 9, wherein in a case where the target virtual character acquires a survival tool, adding the survival tool into the toolbar in response to a user's first preset operation for the survival tool further comprises:

after storing the survival tool in the item backpack, adding the survival tool into the toolbar in response to the user's first preset operation for the survival tool in the item backpack.

16. The electronic device according to claim 9, wherein the controlling the target virtual character to complete the target survival project in response to a second preset operation for the survival activity control comprises:

controlling the target virtual character to switch a piece of equipment in use to the target survival tool in response to the second preset operation for the survival activity control; and controlling the target virtual character to use the target survival tool to complete project content of the target survival project.

17. A non-transitory computer program product comprising a computer program which, when run by a processor, performs the steps of a game controlling method applied to a terminal provided with a graphic user interface having displayed therein at least a part of a game scene and a target virtual character in the game scene, the target virtual character being provided with an item backpack for storing virtual items, an equipment bar for equipping weapon equipment, and a toolbar for equipping survival tools, the method comprising:

in a case where the target virtual character acquires a survival tool, adding the survival tool into the toolbar in response to a user's first preset operation for the survival tool, comprising:

detecting whether there is a vacant bar location in the toolbar; and adding the survival tool into the toolbar if there is the vacant bar location in the toolbar, or storing the survival tool in the item backpack if there is no vacant bar location in the toolbar;

in a case where the target virtual character triggers a target survival project, providing, in the graphical user interface, a survival activity control matched with the target survival project if a target survival tool adapted to the target survival project has been added in the toolbar; and controlling the target virtual character to complete the target survival project in response to a second preset operation for the survival activity control.

18. The non-transitory computer program product according to claim 17, wherein the method further comprises:

presenting the toolbar and a plurality of the survival tools added in the toolbar in response to a third preset operation for the target virtual character; and presenting tool information of the survival tool at a location corresponding to the survival tool.

* * * * *